No. 848,872. PATENTED APR. 2, 1907.
T. S. BAILEY & L. Y. SPEAR.
SUBMARINE OR SUBMERGIBLE BOAT.
APPLICATION FILED JUNE 26, 1905.
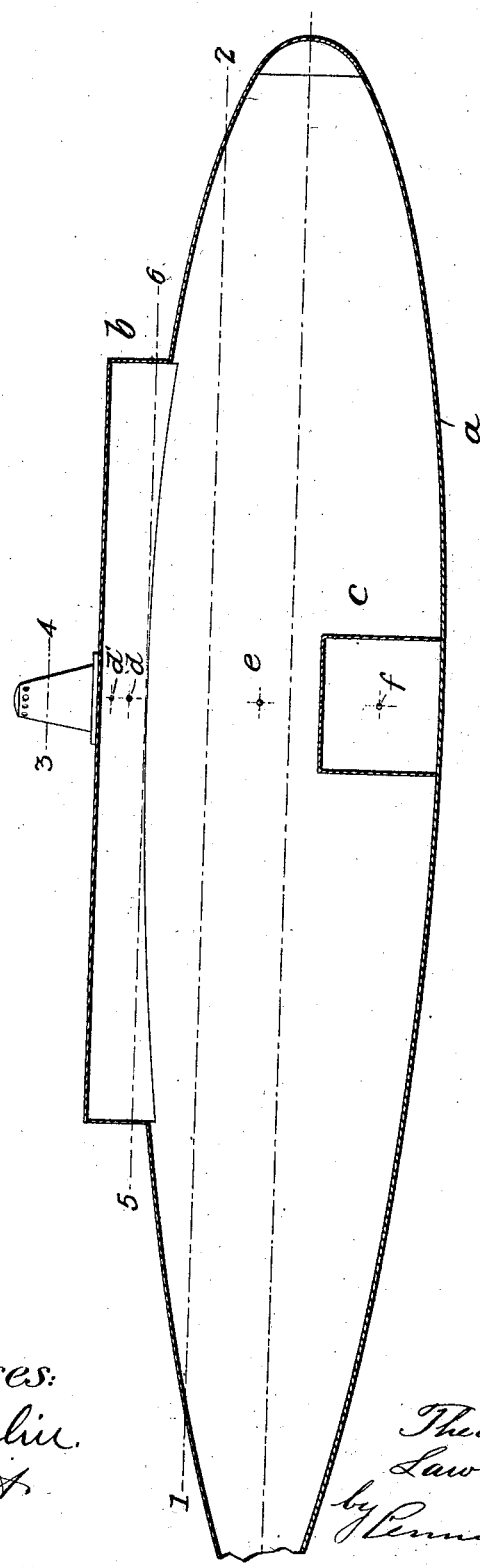

UNITED STATES PATENT OFFICE.

THEODORUS S. BAILEY AND LAWRENCE Y. SPEAR, OF QUINCY, MASSACHU-SETTS, ASSIGNORS TO ELECTRIC BOAT COMPANY, OF BAYONNE, NEW JERSEY, A CORPORATION OF NEW JERSEY.

SUBMARINE OR SUBMERGIBLE BOAT.

No. 848,872.     Specification of Letters Patent.     Patented April 2, 1907.

Application filed June 26, 1905. Serial No. 267,023.

*To all whom it may concern:*

Be it known that we, THEODORUS S. BAILEY and LAWRENCE Y. SPEAR, both citizens of the United States, and both residing at Quincy, Norfolk county, Massachusetts, have invented certain new and useful Improvements in Submarine or Submergible Boats; and we do hereby declare the following to be a full, clear, and exact description of the invention, such as will enable others skilled in the art to which it appertains to make and use the same.

This invention relates to submarine or submergible boats, and more particularly to the form of hull of boats of this character designed to operate either on the surface with considerable buoyancy and stability or wholly submerged or in any intermediate position.

The invention is designed particularly for use in connection with that class of submarine boats which have, in addition to the ordinary ballast tank or tanks for submerging them in fresh water, an auxiliary tank or tanks for completing the submergence in salt water. Such a tank, for instance, is provided for, and termed an "auxiliary" tank, in United States Patent to J. P. Holland, No. 694,154, dated February 25, 1902. In vessels of this character the filling of the main submergence-tanks in fresh water serves to completely submerge the vessel. In salt water, however, the filling of these main tanks does not completely submerge the vessel, owing to the increased density of the water of flotation. The auxiliary tank is provided for the purpose of completing the submergence in salt water, and it is not ordinarily used in fresh water.

It is desirable that submarine or submergible boats should float while lying still with the stern more deeply submerged than the bow, and to this end the weight within the vessel is so distributed that when all the submergence-tanks are empty the vessel will have the desired trim by the stern. It is further desirable, however, that when the vessel is submerged it shall be on an even keel. The act of submergence then consists in adding weight to the vessel to sink it and in so distributing the added weight that the vessel will be brought from its normal trim by the stern when light to an even keel when submerged. This submergence is accomplished by admitting water to the main submergence-tanks, which are so located that the center of gravity of their contents when they are full is slightly forward of the center of buoyancy of the boat as a whole. This is the complete operation in fresh water, and it brings the vessel awash—that is, the whole vessel is under water excepting the conning-tower—and the vessel is ready for diving. In salt water, however, the difficulty is encountered that the filling of these same main submergence-tanks does not completely submerge the vessel, and to complete the submergence in salt water Holland added the auxiliary submergence-tank. However, in the Holland boats the portion of the vessel left unsubmerged when the main tanks are filled in salt water is unsymmetrical in shape, being fuller at the bow than at the stern. The result is that its center of buoyancy is forward of the center of gravity of the vessel as a whole, and owing to the peculiar shape of this unsubmerged position its center of buoyancy moves forward as the boat sinks. The center of gravity of the auxiliary tank is fixed, and therefore does not follow the shifting center of buoyancy of the unsubmerged portion, and the result is a turning movement of the vessel during this last stage of submergence in salt water.

Our improvement consists in so constructing the vessel and its main submergence-tanks that the irregular body portion of the vessel is completely submerged by the filling of the main submergence-tanks in water of the greatest density in which the boat is called upon to operate and in providing for the increased buoyancy necessary to prevent the complete submergence of the vessel by the filling of the same main submergence-tanks in fresh water by means of a buoyant protuberance on the upper part of the hull of the vessel. This buoyant protuberance is so constructed that its center of buoyancy for all degrees of submergence is in the same straight line, and it is so located that this line substantially coincides with a vertical line through the center of buoyancy of the vessel as a whole when submerged, and the center of gravity of the auxiliary tank. With this construction the weight of water admitted to the auxiliary tank is always added in line with the center of buoyancy of the unsubmerged portion of the vessel, and the turning moment during the last stage of submergence in salt water is avoided.

In the accompanying drawings, Figure 1 is a vertical longitudinal section through a submarine or submergible boat, showing an embodiment of this invention; and Fig. 2 is a partial vertical transverse section through the same.

Referring to the drawings, $a$ indicates the main hull of the boat, which is of the usual cigar shape, generally circular or approximately circular in cross-section.

$c$ is the auxiliary submergence-tank and is here shown within the hull proper, but which could, if desired, be located in an appendage or superstructure. This tank is so proportioned and arranged that its center of gravity $f$ lies substantially in the same vertical line as the center of buoyancy $e$ of the boat as a whole when submerged or awash. The main ballast or submergence tanks or spaces commonly employed are not shown, their positions not being germane to this invention.

In Fig. 1 of the drawings the line 1 2 indicates the water-line at which the boat floats in sea-water when operated upon the surface with the maximum buoyancy, it being usual in this position for the vessel to trim by the stern. The line 3 4 indicates the water-line when the boat is ready for diving.

In operation the boat is first brought to some such water-line, as indicated by the line 5 6, by admitting the required amount of water to the main ballast or submergence tanks or spaces only. It is then brought from the water-line 5 6 to the water-line 3 4 by admitting water into the auxiliary tank $c$. The exact position of the line 5 6 would of course depend upon the density of the water of flotation, and in fresh water it coincides with the line 3 4.

It is to be observed that the buoyancy of the portion of the hull between such a line as 5 6 and the line 3 4 is to be destroyed by admitting water into the auxiliary tank or tanks, and in order that no change in longitudinal trim shall take place as the boat sinks from line 5 6 to line 3 4 it is essential that the construction be such that the displacement of the upper part of the hull and its appendages (to an extent at least equal to the capacity of the tank $c$) shall be so arranged that its center of buoyancy at all stages of submergence shall remain substantially in a vertical line passing through the center of gravity $f$ of the auxiliary tank or tanks.

To avoid limiting the shape and proportions of the main hull $a$, this purpose is preferably accomplished by providing the upper side of the hull with a buoyant chamber or protuberance $b$, made water-tight and of the desired strength to resist compressing pressures. The protuberance $b$ may be circular in section, as shown in Fig. 2 of the drawings, or it may be constructed of any other desired section which is sufficiently strong to resist the hydrostatic pressures to which the boat may be subjected, and, further, this protuberance may be shaped and built as an integral part of the hull or as an appendage of the hull proper, provided, however, in all cases that it be so formed that its center of buoyancy at all stages of submergence shall be in the same vertical line and that this vertical line shall pass through or very near the point $f$, which is the center of gravity of the auxiliary tank $c$, and the point $e$, which is the center of buoyancy of the boat as a whole when submerged. The buoyancy of the displacement so formed, including that portion of the conning-tower and any other similar appendage below the line 3 4, should be at least equal to the weight of the contents of the auxiliary tank. This object may be obtained in a number of different ways—thus by making the protuberance of uniform cross-section on each side of the plane $d\ e\ f$ or by giving both ends equal taper, either straight or curved, or by making any other sort of a chamber of sufficient dimensions, whether said chamber be included in the construction of the boat proper or made as a protuberance or appendage.

Having thus described our invention, what we claim, and desire to secure by Letters Patent, is—

1. A submarine or submergible boat having a submergence-tank, the center of volume of whose contents is substantially in vertical alinement with the center of buoyancy of the immersed portion of the boat, said boat having a buoyant chamber so constructed and located that the centers of all water-planes passing therethrough shall lie substantially in a vertical line passing through the center of volume of the contents of said submergence-tank.

2. A submarine or submergible boat having a submergence-tank within the same, and a buoyant protuberance upon the upper portion of the boat, said tank and protuberance being so situated that the centers of gravity of the contents of the one and the centers of buoyancy of the other shall be substantially in the same vertical line for all degrees of submergence.

3. A submarine or submergible boat having a submergence-tank within the same, and a buoyant protuberance upon the upper portion of the boat, said tank and protuberance having relative volumes such that the weight of the contents of the auxiliary tank when full is substantially equal to the buoyancy of the buoyant protuberance and being so situated that the centers of gravity of the contents of the one and the centers of buoyancy of the other shall be substantially in the same vertical line for all degrees of submergence.

4. A submarine or submergible boat having a submergence-tank, the center of volume of whose contents is in substantially vertical alinement with the center of volume of the boat submerged, and a buoyant protuberance so located in the upper portion of the hull that its centers of buoyancy lie in substantially vertical alinement with the centers of gravity of the contents of said tank for all degrees of submergence.

5. In a submarine or submergible boat of the type having an auxiliary submergence-tank, the center of volume of whose contents is substantially in vertical alinement with the center of buoyancy of the boat as a whole when submerged, the combination with said tank of a buoyant protuberance upon the upper portion of the hull, said tank and protuberance having relative volumes such that the weight of the contents of the auxiliary tank when full is substantially equal to the buoyancy of the buoyant protuberance, and being so situated and proportioned that the center of gravity of the contents of the one and the center of buoyancy of the other shall be substantially in the same vertical line for all degrees of submergence of the protuberance.

6. In a submarine or submergible boat, main submerging means adapted to completely submerge the boat in fresh water and incapable of completely submerging the boat in salt water, and auxiliary submerging means adapted to complete the submergence in salt water, the boat being so shaped that the emersed portion of the boat when the main submergence means is operated in salt water has its center of buoyancy for all degrees of submergence substantially in vertical alinement with the center of buoyancy of the boat as a whole when submerged.

In testimony whereof we affix our signatures in presence of two witnesses.

THEODORUS S. BAILEY.
LAWRENCE Y. SPEAR.

Witnesses:
F. L. BRAKE,
W. D. FESLER.